United States Patent [19]
Takenaka et al.

[11] 3,764,632
[45] Oct. 9, 1973

[54] OXYDEHYDROGENATION PROCESS

[75] Inventors: Shigeo Takenaka; Akira Iwamoto, both of Takasaki, Japan

[73] Assignee: Nippon Kayaku Kabushiki Kaisha, Tokyo, Japan

[22] Filed: Oct. 20, 1970

[21] Appl. No.: 82,489

[30] Foreign Application Priority Data
Feb. 5, 1970 Japan.................................. 45/9603

[52] U.S. Cl.............. 260/680 E, 252/432, 252/437
[51] Int. Cl................................................. C07c 5/18
[58] Field of Search .................................. 260/680 E

[56] References Cited
UNITED STATES PATENTS

| | | | |
|---|---|---|---|
| 3,414,631 | 12/1968 | Grasselli et al. | 260/680 |
| 3,453,344 | 7/1969 | Aliev et al. | 260/680 |
| 3,522,299 | 7/1970 | Takenaka et al. | 260/604 X |
| 3,576,764 | 4/1971 | Yamaguchi et al. | 252/437 |
| 3,642,930 | 2/1972 | Grasselli et al. | 260/680 |

*Primary Examiner*—Paul M. Coughlan, Jr.
*Attorney*—Russell & Nields

[57] ABSTRACT

Conjugated dienes, such as butadiene, are prepared from monoolefins, such as butene-1, by oxydehydrogenation over a catalyst represented by the following general formula:

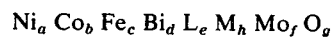

$$Ni_a Co_b Fe_c Bi_d L_e M_h Mo_f O_g$$

in which L is phosphorus, arsenic or boron, and M is potassium, rubidium or cesium, and wherein $a$ and $b$ have a value of from 0 to 15, $a+b$ being 2 to 15, $c$ is 0.5 to 7, $d$ is 0.1 to 4, $e$ is 0 to 4, $f$ is 12, $g$ is a number determined by the valence requirements represented by Ni, Co, Fe, Bi, L, M and Mo, and $h$ is 0.01 to 1.0.

5 Claims, No Drawings

OXYDEHYDROGENATION PROCESS

DESCRIPTION AND BACKGROUND OF THE INVENTION

This invention relates to a process for the conversion of monoolefins to conjugated diene by means of a catalytic oxydehydrogenation and is most particularly concerned with the formation of butadiene-1, 3 and isoprene from the n-butenes and the isopentenes, respectively.

This process involves passing a monoolefin and molecular oxygen, such as air, in the presence or absence of a diluent such as steam, carbon dioxide, nitrogen or other inert gas at a moderate temperature over a catalyst comprising following composition $$Ni_a Co_b Fe_c Bi_d L_e M_h Mo_f O_g$$

in which L is phosphorus, arsenic or boron, M is potassium, rubidium or cesium; and wherein $a$ and $b$ have a value of from 0 to 15, $a+b$ being 2 to 15, $c$ is 0.5 to 7, $d$ is 0.1 to 4, $e$ is 0.1 to 4, $f$ is 12, $g$ is number determined by the valence requirements represented by Ni, Co, Fe, Bi, L, M and Mo, and $h$ is 0.01 to 1.0.

In this specification, the terms conversion, selectivity and single pass yield are defined as follows:

$$Conversion\ (\%) = \frac{mols\ of\ monoolefin\ reacted}{mols\ of\ monoolefin\ supplied} \times 100$$

$$Selectivity\ (\%) = \frac{mols\ of\ conjugated\ diene\ formed}{mols\ of\ monoolefin\ reacted} \times 100$$

$$Single\ pass\ yield\ (\%) = \frac{mols\ of\ conjugated\ diene\ formed}{mols\ of\ monoolefin\ supplied} \times 100$$

Previous attempts to produce dienes by catalytic oxydehydrogenation of monoolefins, similar to the present invention, are disclosed in U.S. Pat. No. 3,414,631. In this patent, monoolefins are converted to dienes by the use of a catalyst represented by the formula A, B, Fe, Bi P, Mo, O, wherein A is nickel or a combination of nickel and cobalt, B is at least one member selected from the group consisting of antimony, tin, copper and arsenic, and the maximum single pass yield of butadiene and isoprene is 83.1 percent and 31.8 percent, respectively.

The present invention has been accomplished as a result of various studies to further raise the single pass yield of conjugated dienes. The present catalyst is distinctive, among other reasons, because it contains potassium, rubidium or cesium.

In the present invention, the catalyst comprising Co, Fe, Bi, P, K, Mo and O is most preferable, and a single pass yield of butadiene and isoprene of up to 96 percent and 71 percent, respectively, is achieved by the catalyst. Butadiene was produced from a n-butene, and isoprene was produced from 2-methyl-butene-2, 2-methyl-butene-1 and 3-methyl-butene-1. In accordance with the invention oxidation to maleic acid, carbon monoxide, carbon dioxide etc. is inhibited.

The present catalyst may be prepared by any suitable method of combining the various metals or metal oxides, preferably with a binder or on a carrier. A suitable procedure is to form a slurry or solution of compound in proper proportions, for example, by adding to an aqueous molybdate solution, such as ammonium molybdate, an L compound, such as phosphoric, arsenic or boric acid and an M compound, such as potassium, rubidium or cesium nitrate, and then by adding water-soluble compounds of nickel, cobalt, iron and bismuth as the occasion demands.

A suitable carrier may then be added to the slurry-like suspension, which is then heated to dryness to form a cake. The cake may be pelleted and calcined to provide the final catalyst.

In place of ammonium molybdenum oxide or molybdic acid may be used to provide Mo. Potassium molybdate may be used to provide both Mo and M. The remaining metals, nickel, cobalt, iron and bismuth, may be provided as nitrates.

The catalyst of the invention is preferably incorporated on a carrier material, such as silica, silicon carbide or alumina. Silica gel or silica sol is particularly suitable. The catalyst is preferably in the form of grain or tablet. Generally, the catalyst is employed as a fixed bed, but it may be a moving bed or fluidized bed, as well.

The catalytic oxydehydrogenation reaction of the invention is carried out by the oxydehydrogenation of olefins to diene, preferably at a temperature of about 250°–500°C and at pressure of 0.5–10 atm. The contact time of monoolefin, air and steam preferably is about 0.5–8 seconds, under normal pressure and reaction temperature. The gaseous mixture to be passed over the catalyst is preferably prepared by mixing a monoolefin, air and steam so as to give a proportion of 0.25–3 mols of oxygen and 1–20 mols of water to 1 mol of monoolefin. The following examples are given in order to illustrate the invention without limiting the same.

EXAMPLES 1–5

22.0g of nickel nitrate, 39.4g of cobalt nitrate and 36.6g of ferric nitrate was dissolved in distilled water, respectively, and 14.7g of bismuth nitrate was dissolved in distilled water acidified with concentrated nitric acid and those nitrate solutions were mixed.

Sufficient phosphoric acid (85 percent) and potassium nitrate, respectively, to provide a final product having a value of $e$ of 0.5 and of $h$ of 0.03, was added to an aqueous solution of 63.6g of ammonium molybdate dissolved in distilled water and then the foregoing mixed nitrate solution was added.

10g of silica sol (as $SiO_2$) was added, and the resulting suspension heated to dryness, and further calcined for 4 hours at 650°C.

The obtained catalyst was pulverized to about 20 mesh, and 60 ml of this catalyst, having the composition of $Ni_{2.5} Co_{4.5} Fe_3 Bi_1 P_e K_h Mo_{12}OO_{(52.5+2.5e+0.5h)}$ was used to fill a stainless steel reactor having an inner diameter of 20mm, immersed in a niter bath. A gaseous mixture of butene-1, air and steam, in a molar ratio of 1:10:5, was passed over the catalyst, for a contact time of 2.5 seconds, while the niter bath temperature was 305°C.

For examples 2–5 the procedure of example 1 was followed, with variations in the phosphorous ($e$) or potassium ($h$) constituents and bath temperature as shown in table I.

The products of examples 1–5 were analyzed by gas-liquid chromotographic analysis (G.L.C.), and the acid by-product was determined by values of conversion, selectivity and yield shown in table I.

solution, and combined with 63.6g of ammonium molybdate dissolved in distilled water; with heating and stirring. 18.1g of silica sol (as $SiO_2$) was added to the resulting solution and then 22.0g of nickel nitrate, 39.4g of cobalt nitrate and 36.6g of ferric nitrate, respectively, dissolved in distilled water and 14.7g of bismuth nitrate dissolved in distilled water acidified with concentrated nitric acid were added.

The suspension produced was stirred and dried over a water bath. The dried cake was calcined for 4 hours at 650°C in air and pulverized to about 20 mesh.

TABLE I

| Example No. | Value of $e$ | Value of $h$ | Niter bath Temperature (°C) | Conversion of butene-1 (%) | Selectivity of butadiene (%) | Single pass yield of butadiene (%) |
|---|---|---|---|---|---|---|
| 1 | 0.5 | 0.03 | 305 | 95 | 93 | 88 |
| 2 | 0.5 | 0.08 | 320 | 99 | 97 | 96 |
| 3 | 0.5 | 0.2  | 340 | 98 | 94 | 92 |
| 4 | 2.0 | 0.2  | 325 | 98 | 96 | 94 |
| 5 | 0   | 0.03 | 295 | 95 | 90 | 85 |

TABLE II

| Example No. | Composition of the catalyst | Bath temp. (°C) | Conversion of butene-1 (%) | Selectivity of butadiene (%) | Single pass yield of butadiene (%) |
|---|---|---|---|---|---|
| 6  | $Ni_{2.5}Co_{4.5}Fe_3Bi_1As_{0.5}K_{0.08}Mo_{12}O_{54}$ | 320 | 98 | 97 | 95 |
| 7  | $Ni_{2.5}Co_{4.5}Fe_3Bi_1B_{0.5}K_{0.08}Mo_{12}O_{54}$ | 320 | 98 | 97 | 95 |
| 8  | $Ni_{2.5}Co_{4.5}Fe_3Bi_1P_{0.5}Rb_{0.08}Mo_{12}O_{54}$ | 320 | 100 | 89 | 89 |
| 9  | $Ni_{2.5}Co_{4.5}Fe_3Bi_1P_{0.5}Cs_{0.24}Mo_{12}O_{54}$ | 320 | 95 | 93 | 88 |
| 10 | $Co_6Fe_1Bi_1P_{0.5}K_{0.08}Mo_{12}O_{50}$ | 340 | 95 | 95 | 90 |
| 11 | $Ni_{11}Fe_1Bi_1P_{0.5}K_{0.08}Mo_{12}O_{57}$ | 300 | 98 | 95 | 93 |
| 12 | $Ni_1Co_2Fe_3Bi_3P_1K_{0.1}Mo_{12}O_{52}$ | 320 | 97 | 95 | 92 |
| 13 | $Co_{10}Fe_{0.5}Bi_{0.5}P_{0.5}K_{0.08}Mo_{12}O_{54}$ | 340 | 97 | 91 | 88 |
| 14 | $Ni_1Co_1Fe_8Bi_1P_{0.5}K_{0.08}Mo_{12}O_{51}$ | 300 | 96 | 90 | 86 |
| 15 | $Ni_4Co_8Fe_{1.5}Bi_{0.5}P_{0.5}K_{0.08}Mo_{12}O_{55}$ | 320 | 95 | 95 | 90 |
| 16 | $Ni_{2.5}Co_{4.5}Fe_3Bi_1P_4K_{0.4}Mo_{12}O_{63}$ | 365 | 93 | 93 | 86 |
| 17 | $Ni_{2.5}Co_{4.5}Fe_3Bi_1P_{0.5}K_{0.05}Mo_{12}O_{54}$ | 310 | 97 | 95 | 92 |

The by-products principally were minor amounts of carbon monoxide, carbon dioxide, maleic acid, acrylic acid and acetic acid.

EXAMPLES 6–17

The catalysts shown in Table II were obtained by procedures similar to that described in Examples 1–5. In Example 6, arsenious acid was substituted for phosphoric acid, and in Example 7, boric acid was used. In Example 8 rubidium nitrate was substituted for potassium nitrate, and in Example 9 cesium nitrate was used. In Examples 10 and 13 the nickel nitrate was omitted, and in Example 11 the cobalt nitrate was omitted. In all of the examples the proportions of the constituents were such as to yield the ultimate composition shown in Table II.

EXAMPLE 18

Except for the use of butene-2, consisting of trans-butene-2 (80 percent) and cis-butene-2 (20 percent), in the place of butene-1, and bath temperature 350°C, the catalyst and reaction conditions were the same as in Example 2. The results were: conversion of 95 percent, selectivity of 90 percent, and single pass yield of 85 percent.

EXAMPLE 19

1.69g of phosphoric acid (85 percent) and 0.219g of potassium nitrate was added and dissolved in aqueous The catalyst composition was

$Ni_{2.5}Co_{4.5}Fe_{3.0}Bi_{1.0}P_{0.5}K_{0.072}Mo_{12}O_{54}$.

60 ml of the catalyst was used in a stainless steel reactor having an inner diameter of 20 mm. The reactor was immersed in a niter bath, and a reactant stream of 2-methyl-3-butene air and steam in a mole ratio of 1:10:10 was passed over the catalyst, with a contact time (based on reaction temperature) of about 3.5 sec.

The niter bath temperature and the results of reaction are shown in the Table III.

The by-products included isomerized 2-methyl-3-butene, 2-methyl-1-butene and 2-methyl-2-butene, carbon monoxide, carbon dioxide and others, for example, aldehydes and organic acids.

TABLE III

| Niter bath Temp. (°C) | Conversion (%) | Selectivity of isoprene (%) | Single pass yield of isoprene (%) |
|---|---|---|---|
| 336 | 56.8 | 81.0 | 45.9 |
| 343 | 74.0 | 83.3 | 61.7 |

EXAMPLE 19a

In order to provide a comparative example, potassium nitrate was omitted from the catalyst preparation of Example 19, and the resulting catalyst composition was represented by formula $$Ni_{2.5}Co_{4.5}Fe_{3.0}Bi_{1.0}P_{0.5}Mo_{12}O_{54}.$$

The reaction condition was the same as that of Example 19 except the bath temperature was raised to 358°C. for raising of the single pass yield of isoprene.

The results were: conversion, 82.3 percent, selectivity, 32.6 percent, and single pass yield, 26.8 percent.

EXAMPLES 20–34

The catalysts having the composition shown in Table IV were produced by a procedure similar to that described in Example 19. The catalysts were used to convert 2-methyl-3-butene to isoprene by oxydehydrogenation. The reaction conditions were the same as that of Example 19 except the bath temperature. The bath temperature and the results were shown in Table IV.

In the preparation, nickel nitrate was omitted in Examples 29 and 32, cobalt nitrate was omitted in Example 30, phosphoric acid was omitted in Example 20, arsenous acid in Example 25 and boric acid in Example 26 were substituted for phosphoric acid, and rubidium nitrate in Example 27 and cesium nitrate in Example 28 were substituted for potassium nitrate. In each Example the proportions of the various ingredients were chosen to yield ultimate catalysts having the formulas in Table IV.

EXAMPLE 35

The catalyst of Example 22 was used to convert a reactant stream of 2-methyl-1-butene, air and water (steam) in the molar ratio of 1:16:16, respectively. The bath temperature was 330°C. The results are shown in Table V. Otherwise, the reaction conditions were the same as for Example 19.

EXAMPLE 36

The catalyst of Example 22 was again used to convert a feed stream of 2-methyl-2-butene, air and water (steam) in the molar ratio of 1:20:21, respectively, and the bath temperature was 320°C. Otherwise, Example 19 was followed. The results are shown in Table V.

EXAMPLES 37a–d

Four catalysts having the same composition ($Ni_{2.5}Co_{4.5}Fe_{3.0}Bi_{1.0}P_{0.5}K_{0.072}Mo_{12}O_{54}$) as that of Example 19 were produced by the same procedure except that the catalysts were calcined for 4 hours at 500°, 550°, 600° and 700°C, respectively. The reaction conditions were the same as described in Example 19, aside from bath temperature. The results were shown in Table VI.

EXAMPLE 38

The same catalyst as that of Example 29 was used. The reaction conditions were the same as that of Example 19 except that the feed was composed of 2-methyl-3-butene, air and steam in mol ratio of 1:5.0:9.3, respectively, and the bath temperature was raised to 357°C.

The results were: conversion, 77 percent, selectivity, 92 percent, and single pass yield, 71 percent.

EXAMPLE 39

A catalyst having the composition presented by the formula $$Co_{10}\ Fe_{0.5}\ Bi_{0.5}\ As_{0.5}\ K_{0.08}\ Mo_{12}\ O_{54}$$

was obtained by a procedure similar to that described in Examples 1–5, and was used to produce butadiene from butene-1 by oxydehydrogenation.

The feed stream was butene-1, air and steam, in a mole ratio of 1:10:5; contact time was 2.5 seconds, and the niter bath temperature was 340°C.

The results were: conversion, 96 percent, selectivity, 93 percent, and single pass yield, 89 percent.

EXAMPLES 40–41

Catalysts having the composition presented by the formulas.

$$Co_{6.0}\ Fe_{1.0}\ Bi_{1.0}\ B_{0.5}\ K_{0.10}\ Mo_{12}\ O_{50} \quad (40)$$

and $$Co_{6.0}\ Fe_{1.0}\ Bi_{1.0}\ As_{0.5}\ K_{0.10}\ Mo_{12}\ O_{50} \quad (41)$$

were produced by the procedure similar to that described in Examples 19–34.

The catalysts were used to produce isoprene from 2-methyl-3-butene by oxydehydrogenation, by a procedure similar to that of Example 19. The bath temperature and the results of reaction are shown in Table VII.

TABLE IV

| Example No. | Composition of the catalyst | Bath temp. (°C) | Conversion of 2-methyl-3-butene (%) | Selectivity of isoprene (%) | Single pass yield of isoprene (%) |
|---|---|---|---|---|---|
| 20 | $Ni_{2.5}Co_{4.5}Fe_{3.0}Bi_{1.0}K_{0.102}Mo_{12}O_{53}$ | 340 | 72 | 78 | 56 |
| 21 | $Ni_{2.5}Co_{4.5}Fe_{3.0}Bi_{1.0}P_{2.0}K_{0.102}Mo_{12}O_{58}$ | 348 | 67 | 82 | 55 |
| 22 | $Ni_{2.5}Co_{4.5}Fe_{3.0}Bi_{1.0}P_{0.5}K_{0.102}Mo_{12}O_{54}$ | 337 | 73 | 88 | 64 |
| 23 | $Ni_{2.5}Co_{4.5}Fe_{3.0}Bi_{1.0}P_{0.5}K_{0.409}Mo_{12}O_{54}$ | 351 | 66 | 86 | 57 |
| 24 | $Ni_{2.5}Co_{4.5}Fe_{3.0}Bi_{1.0}P_{0.5}K_{0.205}Mo_{12}O_{54}$ | 351 | 75 | 87 | 65 |
| 25 | $Ni_{2.5}Co_{4.5}Fe_{3.0}Bi_{1.0}As_{0.5}K_{0.102}Mo_{12}O_{54}$ | 335 | 70 | 83 | 59 |
| 26 | $Ni_{2.5}Co_{4.5}Fe_{3.0}Bi_{1.0}B_{0.5}K_{0.102}Mo_{12}O_{54}$ | 334 | 71 | 84 | 59 |
| 27 | $Ni_{2.5}Co_{4.5}Fe_{3.0}Bi_{1.0}P_{0.5}Rb_{0.102}Mo_{12}O_{54}$ | 330 | 72 | 87 | 63 |
| 28 | $Ni_{2.5}Co_{4.5}Fe_{3.0}Bi_{1.0}P_{0.5}Cs_{0.102}Mo_{12}O_{54}$ | 330 | 74 | 85 | 63 |
| 29 | $Co_{6.0}Fe_{1.0}Bi_{1.0}P_{0.5}K_{0.102}Mo_{12}O_{50}$ | 350 | 75 | 91 | 68 |
| 30 | $Ni_{1.0}Fe_{1.0}Bi_{1.0}P_{0.5}K_{0.102}Mo_{12}O_{57}$ | 315 | 74 | 73 | 54 |
| 31 | $Ni_{1.0}Co_{2.0}Fe_{3.0}Bi_{1.0}P_{1}K_{0.102}Mo_{12}O_{52}$ | 350 | 71 | 70 | 50 |
| 32 | $Co_{10.0}Fe_{0.5}Bi_{0.5}P_{0.5}K_{0.012}Mo_{12}O_{54}$ | 350 | 76 | 88 | 67 |
| 33 | $Ni_{1.0}Co_{1.0}Fe_{0.0}Bi_{1.0}P_{0.5}K_{0.102}Mo_{12}O_{51}$ | 320 | 73 | 62 | 45 |
| 34 | $Ni_{2.5}Co_{4.5}Fe_{3}Bi_{1}P_{1}K_{0.1}Mo_{12}O_{65}$ | 369 | 67 | 64 | 43 |

TABLE V

| Example No. | Isopentene as material | Niter bath temp. (°C) | Conversion (%) | Selectivity of isoprene (%) | Single pass yield of isoprene (%) |
|---|---|---|---|---|---|
| 35 | 2-methyl-1-butene | 330 | 97 | 59 | 57 |
| 36 | 2-methyl-2-butene | 320 | 90 | 65 | 59 |

TABLE VI

| Example No. | Calcined temp. (°C) | Niter bath Temp. (°C) | Conversion (%) | Selectivity of isoprene (%) | Single pass yield of isoprene (%) |
|---|---|---|---|---|---|
| 37a | 500 | 314 | 76.7 | 57.6 | 44.2 |
| 37b | 550 | 325 | 74.4 | 58.4 | 43.3 |
| 37c | 600 | 328 | 58.5 | 85.7 | 50.1 |
| 37d | 700 | 340 | 67.2 | 59.9 | 40.4 |

TABLE VII

| Example No. | Niter bath temp. (°C) | Conversion (%) | Selectivity of isoprene (%) | Single pass yield of isoprene (%) |
|---|---|---|---|---|
| 41 | 350 | 76 | 88 | 67 |
| 42 | 345 | 73 | 89 | 65 |

We claim:

1. A catalytic oxydehydrogenation process, which comprises passing a feed stream comprising butene and molecular oxygen over a catalyst having the composition:

$$Ni_a Co_b Fe_c Bi_d L_e M_h Mo_f O_g,$$

wherein L is phosphorus, arsenic or boron and M is potassium, rubidium or cesium, and wherein $a$ and $b$ have a value of from 0–15, $a+b$ being 2 to 15, $c$ is 0.5 to 7, $d$ is 0.1 to 4, $e$ is 0 to 4, $f$ is 12, $g$ is a number determined by the valence requirements represented by Ni, Co, Fe, Bi, L, M and Mo, and $h$ is 0.01 to 1.0, under reaction conditions sufficient to convert said butene to butadiene.

2. The process of claim 1, wherein said catalyst is incorporated on a silica carrier.

3. The process of claim 1, wherein the reaction is carried out in the presence of steam.

4. The process of claim 1, wherein the reaction is carried out at a temperature of from 250° to 500°C.

5. The process of claim 1, wherein said feed stream comprises steam and has a molar ratio of oxygen, steam and monoolefin of 0.25–3:1–20:1.

* * * * *